(12) United States Patent
Oki

(10) Patent No.: US 6,285,106 B1
(45) Date of Patent: Sep. 4, 2001

(54) COMMUTATOR

(75) Inventor: Shigetaka Oki, Yokohama (JP)

(73) Assignee: Igarashi Electric Works Ltd., Kanagawa-Ken (JP)

( * ) Notice: Subject to any disclaimer, the term of this patent is extended or adjusted under 35 U.S.C. 154(b) by 0 days.

(21) Appl. No.: 09/545,326

(22) Filed: Apr. 7, 2000

(30) Foreign Application Priority Data

Nov. 22, 1999 (JP) .................................................. 11-331376

(51) Int. Cl.[7] .............................. H02K 11/00; H01R 39/46
(52) U.S. Cl. ............................ 310/233; 310/220; 310/221
(58) Field of Search .................................... 310/233, 234, 310/235, 236, 43, 220–222, 68 R, 72

(56) References Cited

U.S. PATENT DOCUMENTS

| 5,008,577 | * | 4/1991 | Wang | ................................... | 310/233 |
| 5,717,270 | * | 2/1998 | Lau et al. | .............................. | 310/220 |
| 5,796,203 | * | 8/1998 | Wang | ................................... | 310/233 |
| 5,895,990 | * | 4/1999 | Lau | ..................................... | 310/233 |

* cited by examiner

Primary Examiner—Tran Nguyen
(74) Attorney, Agent, or Firm—Hoffman, Wasson & Gitler

(57) ABSTRACT

A commutator comprises a plurality of commutator segments on the outer circumferential surface and is connected at one end to an armature. At the other end, the commutator has an annular noise-preventing electric element, such as varistor, which has a plurality of connecting electrodes, each of which is electrically connected to each of the commutator segments via a short-circuit conductor, thereby avoiding soldering connection.

12 Claims, 12 Drawing Sheets

COMMUTATOR

BACKGROUND OF THE INVENTION

The present invention relates to a commutator connected to an armature at one end and having a noise-preventing electric element at the other end.

To connect a noise-preventing electric element such as a varistor, a resistance and a thick-film integrated circuit to a commutator in a compact direct current motor, a connecting electrode of an annular noise-preventing electric element is soldered to a connecting portion between a coil and a commutator segment.

For example, the commutator is mounted to an armature in which the coils are applied around an iron core. The windings such as coils are connected to a coil connecting portion of the commutator segment, and the annular noise-preventing electric element is connected to the coil connecting portion of the commutator segment.

A connecting portion between the commutator segment and the coil of the armature is located between the commutator and the coil, and an annular noise-preventing electric element is made such that its diameter is larger than the outer diameter of the commutator. To solder the noise-preventing electric element on a coil-connecting terminal of the commutator, it is necessary to increase the inner diameter of the element.

The terminal of the commutator segment is connected to the connecting electrode of the noise-preventing electric element by soldering electrically and mechanically.

In the above method of connecting the commutator segment to the annular noise-preventing electric element, the internal diameter of the element increases to facilitate assembling, and reduction in precision of the element improves yield. So distance between the electrodes to be soldered increases to lose weight balance to cause vibration.

Further in use the soldered portion is liable to come off by vibration and it is thus preferable to bridge soldering to a spaced portion. The soldering material contains a lot of lead as heavy metal to cause environmental pollution. It is preferable to avoid such use.

To increase bonding performance of the soldering material, resin flux often requires washing of the flux after soldering. Washing requires a lot of organic solvents which are liable to cause environmental pollution, and they should be avoided.

Increase in the number of slots in the commutator increases the number of the commutator segments and the steps of soldering.

Increase in the number of slots increases soldered portions, and unbalance in the soldered amount leads unbalance in rotation mass balance of the armature to cause vibration.

When an armature in which the annular noise-preventing electric element and commutator are soldered is used in high temperature, soldering is melted and scattered to the environment by centrifugal force of the armature, which is dangerous. When high melting point soldering is made, unbalanced thermal impact is applied to sintered low-conduction varistors as noise-preventing electric element in soldering to cause cracking.

Further, difference in thermal capacity between the commutator segment and the noise-preventing electric element requires preheating step of the commutator to make soldering rapidly, but the preheating step involves low thermal efficiency to consume excessive heat energy and increase manufacturing cost.

SUMMARY OF THE INVENTION

In view of the foregoing advantages, it is an object of the present invention to provide a commutator which comprises commutator segments each of which is electrically connected to a noise-preventing electric element without soldering.

BRIEF DESCRIPTION OF THE INVENTION

The features and advantages of the invention will become more apparent from the following description with respect to embodiments which are shown in the appended drawings wherein.

DETAILED DESCRIPTION OF PREFERED EMBODIMENTS

FIGS. 1 to 6 illustrate a commutator according to the present invention which is connected to an armature. In the commutator, a noise-preventing electric element is connected to each of commutator segments of the commutator.

Figure 1:
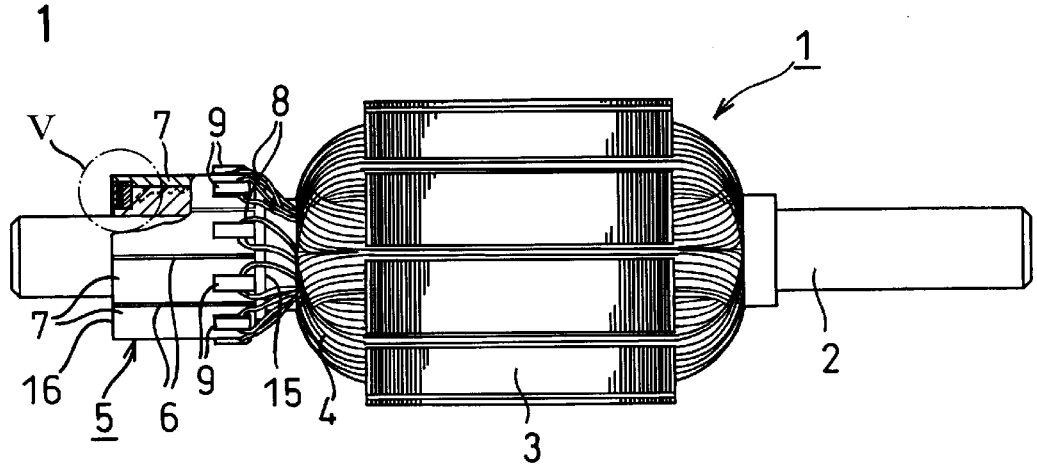
FIG. 1 is a partially cut-away side elevational view of a commutator according to the present invention.

As illustrated in FIG. 1, the armature 1 is fixed to the middle portion of a shaft 2, and comprises an iron core 3 which is divided into a pluralilty of parts, coils 4 wound around the iron core 3, and a commutator 5 fixed to the shaft 2 at the outer end of the coils 4. The number of divisions of the iron core 3 is equal to that of slots of the commutator 5, and the number of the coils 4 is equal to that of the commutator segments 7 to which the commutator 5 is divided by the slots 6 in a circumferential direction. In the embodiment as shown, the numbers of the divisions of the iron core 3, the slots 6 and the commutator segments 7 are all ten at shown in FIG. 3.

The shaft 2, the iron core 3 and the commutator 5 are not rotatable to each other, and the slots 6 of the commutator 5 are corresponding to the polarization of the iron core 3. The ends 8 of the coils 4 are connected to connecting portions 9 of the commutator segments 7.

Figure 2:
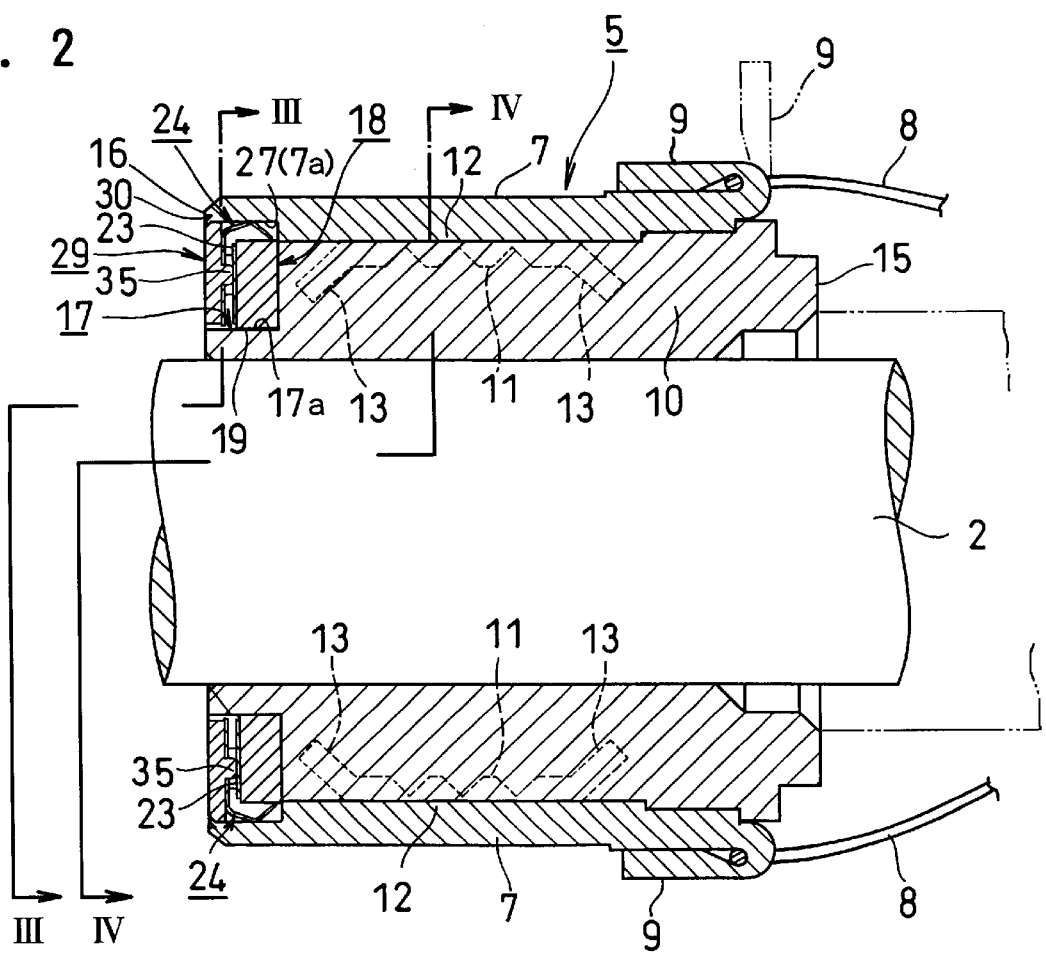
FIG. 2 is an enlarged vertical sectioned side elevational view of the commutator in FIG. 1.

FIG. 2 is a central sectional vertical view of the commutator 5 according to the present invention. On the outer circumferential surface of an insulating tube 10, a plurality of the commutator segments 7 are spaced circumferentially. Each of the commutator segments 7 has an engagement portion 11 on the inner circumferential surface. The engagement portion 11 is embedded on the insulating tube 10, thereby fixing the insulating tube 10 to the commutator segments 7.

As shown in FIG. 2, the engagement portion 11 is projected from an inner base portion 12 of the commutator segment 7, and a pair of ends 13,13 of the engagement portion 11 is inclined into a center to put into the insulating tube 10.

Figure 4:
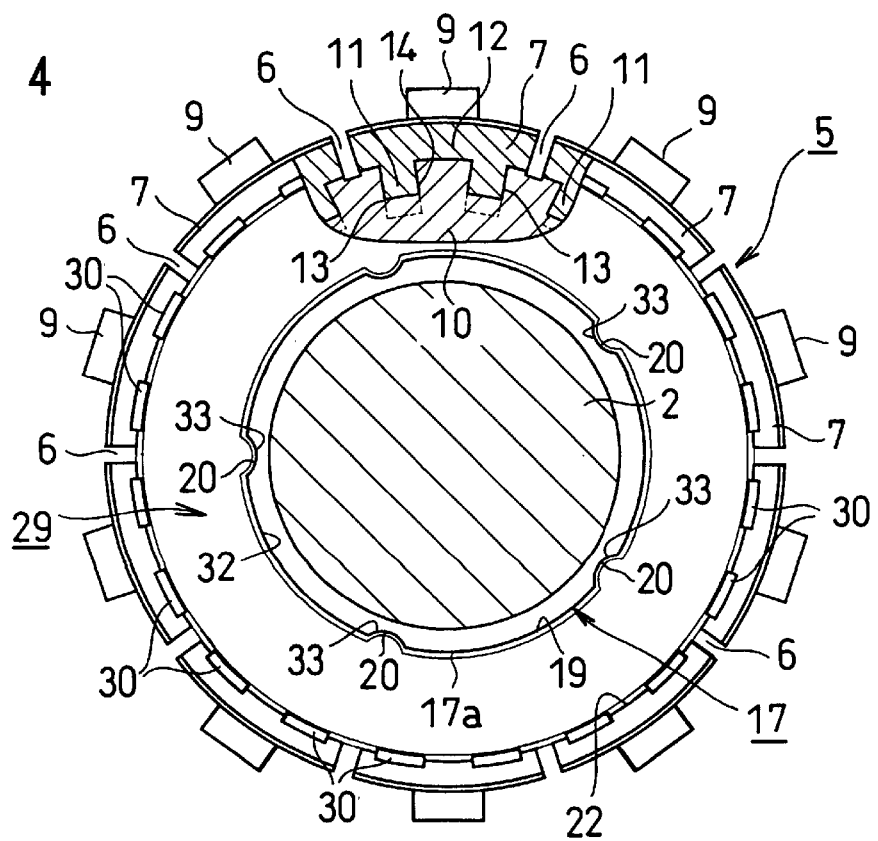
FIG. 4 is a front sectional view taken along the line IV—IV in FIG. 2.

As shown in FIG. 4, the ends 13,13 are spaced from each other in a circumferential direction, and a groove 14 between the ends 13,13 slightly becomes narrower towards the center of the tube 10, thereby preventing disengagement of the commutator segments 7 from the outer circumferential surface of the tube 10.

The ends 13,13 are firmly engaged in the outer circumferential surface of the insulating tube 10, and the commutator segments 7 are thus fixed to the insulating tube 10, thereby preventing each of the commutator segments 7 from being pulled up.

The coil 4 is connected to the end 15 of the insulating tube 10 on which a plurality of the commutator segments 7 are fixed. A narrow connecting portion 9 of the commutator 5 is projected in a radial direction and folded on the outer circumferential surface to grasp the end of the coil 4 to make electrical connection. If the end 8 is covered, it is heated when the connecting portion 9 is folded.

Figure 7:
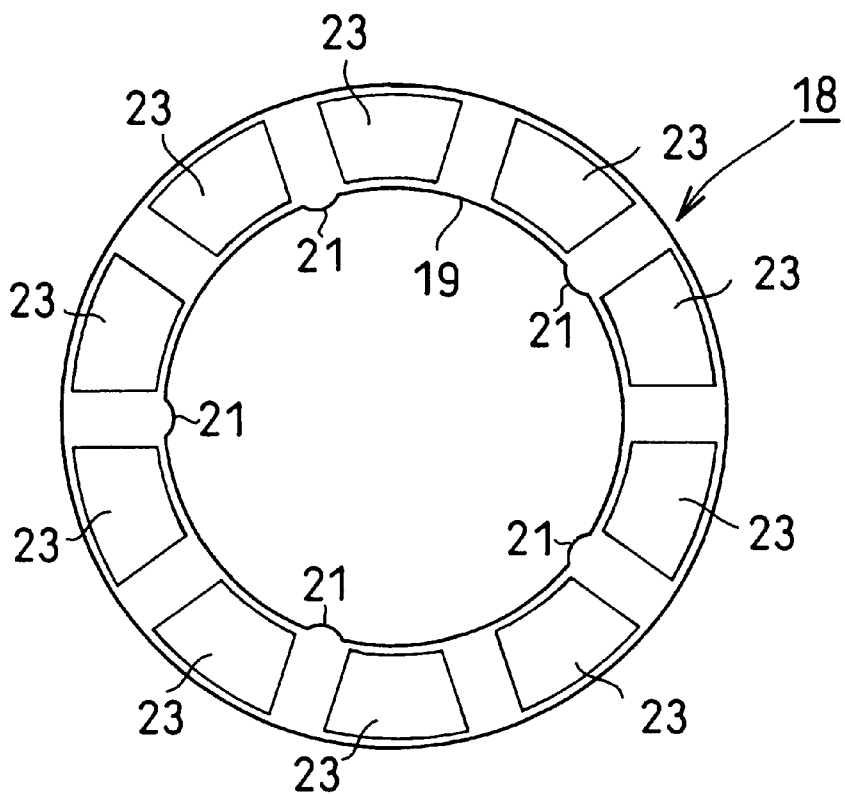
FIG. 7 is a front elevational view of an annular noise-preventing electric element in the present invention.
Figure 8:
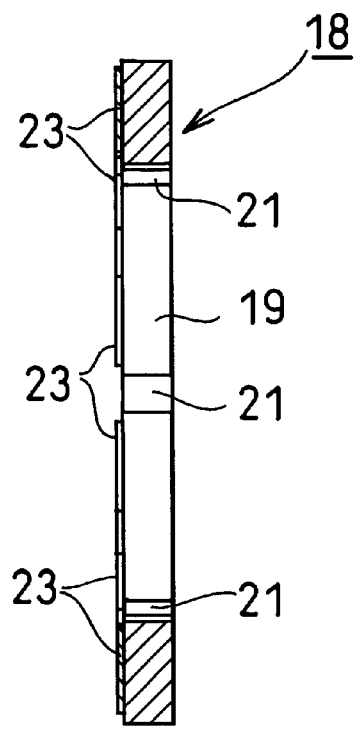
FIG. 8 is a central vertical sectioned right side view of the annular noise-preventing electric element in FIG. 7.

An annular groove 17 is formed at the end 16 of the insulating tube 10, and an annular noise-preventing electric element 18 is engaged in the annular groove 17 as shown in FIGS. 7 and 8. A varistor is widely employed as the noise-preventing electric element. An annular circuit board on which resistances are printed or an annular board on which a condenser or resistance element is printed in a thick-film integrated circuit may be employed as well.

Figure 3:
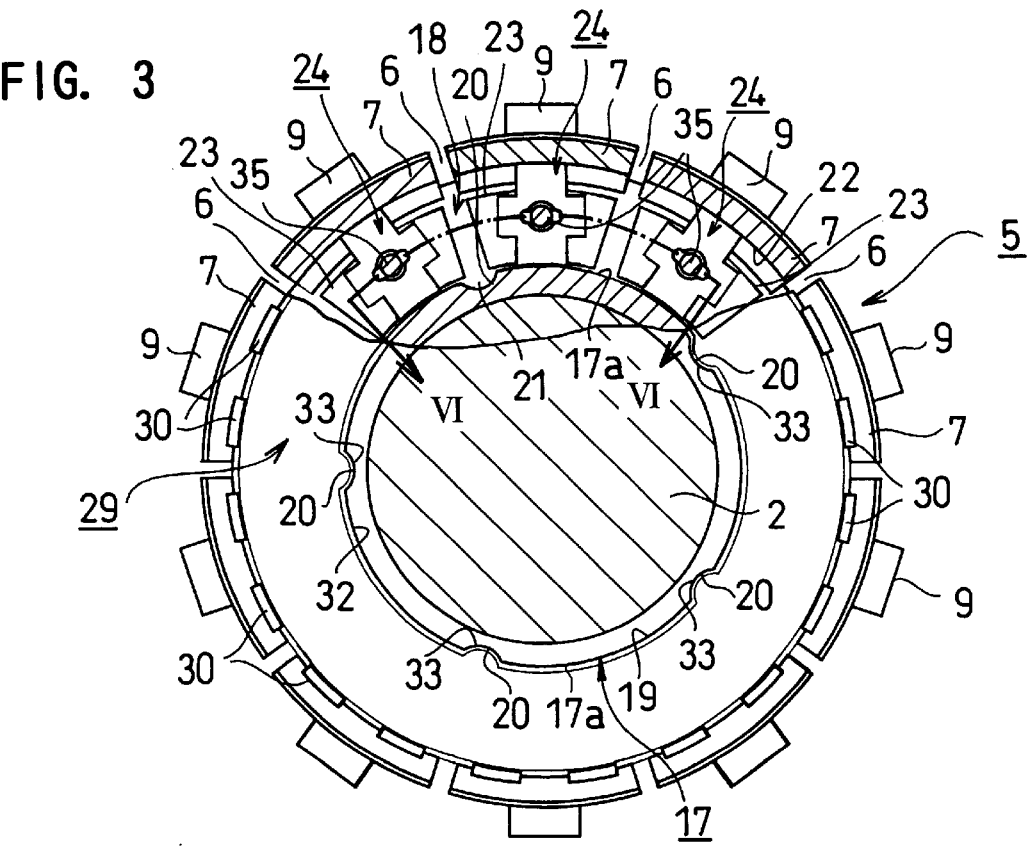
FIG. 3 is a front sectional view taken along the line III—III in FIG. 2.

The inner circumferential surface of the noise-preventing electric element 18 is contacted with the surface of the annular groove 17. A plurality of recesses 20 are formed at regular intervals on the circumferential surface 17a as shown in FIG. 3. A plurality of projections 21 are provided on the inner circumferential surface of the noise-preventing electric element 18. The numbers of the recess 20 and projection 21 may be one respectively. The recesses and projections may be formed on the inner circumferential surface of the noise-preventing electric element 18 and the circumferential surface of the annular groove 17 respectively. Instead of the recesses and projections, other connecting tools may be provided.

A step 22 is formed on the inner circumferential surface of the commutator segment 7 at a position where the recess 20 is formed.

FIGS. 7 and 8 illustrate that a varistor is employed as noise-preventing element. The varistor 18 is made of uniformly sintered annular material which has a plurality of connecting electrodes 23 at regular intervals on the axial end face. The number of the connecting electrodes 23 is equal to that of slots of the commutator 5 to be connected.

A short-circuit conductor 24 is provided in the groove 17 to make short-circuit electrically between the connecting electrode 23 and the inner circumferential surface of the commutator segment 23. The short-circuit conductor 24 is made of electrically conductive high elastic plate such as phosphorus bronze, and comprises a base 25 which faces the connecting electrode 23 of the noise-preventing electric element 18. The base 25 comprises a first contact 26 which is engaged on the connecting electrode 23 and a second contact 28 which extends radially from the first contact 26 and is engaged on the inner circumferential surface 7a of the commutator segment 7.

A lid 29 is provided in the groove 17 to press the short-circuit conductor 23 strongly against the noise-preventing electric element 18 and to prevent disengagement or contamination of the conductor 23. The lid 29 is annular and is engaged with the inner circumferential surface of the commutator segment 7. When the outer surface of the lid 29 is in agreement with the end 16 of the commutator segment, the lid 29 is mounted by a caulking bore 30.

Positioning projections 33 are provided on the inner circumferential surface 32 of the lid 29, and engaged in the recesses of the circumferential surface 17a of the annular groove 17 to fit the short-circuit conductor 24 with the commutator segment 7.

Figure 5:
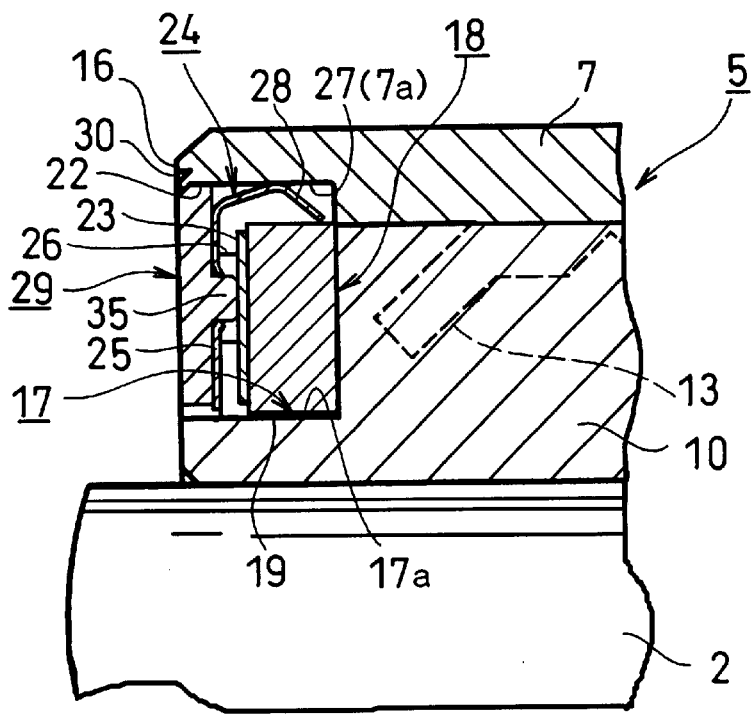
FIG. 5 is an enlarged side view of a cut-away portion of the commutator according to the present invention in FIG. 1.

As shown in FIG. 5, by the engagement of the lid 29, the contact 28 of the commutator segment 7 is inserted and the end thereof is engaged on the outer circumferential surface of the noise-preventing electric element 18. The outer end of the contact 28 is pressed by the inner circumferential surface of the commutator segment 7. The short-circuit conductor 24 electrically contacts the commutator segment 7.

Figure 6:
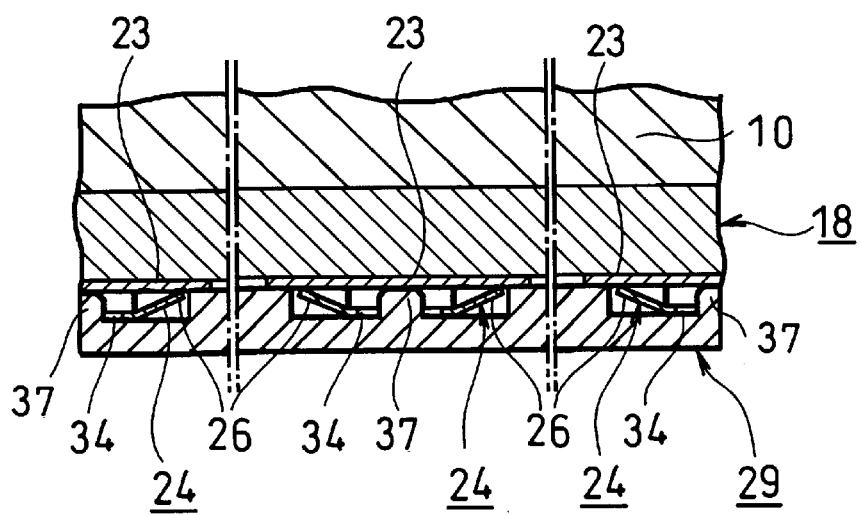
FIG. 6 is a horizontal sectioned plan view taken along the line VI—VI in FIG. 3.

As shown in FIG. 6, when the lid 29 is closed, an elastic portion of the contact 26 is pressed and engaged with the connecting electrode 23 of the noise-preventing electric element 23, so that the short-circuit conductor 24 electrically contacts the connecting electrode 23.

The number of the short-circuit conductors 24 is equal to that of the commutator segments 7, and assembling would be troublesome. Thus, in this embodiment, all the short-circuit conductors 24 were already mounted to the inner surface 31 of the lid 29, and when the lid 29 is mounted, all the short-circuit conductors 24 enable each of the commutator segment 7 to connect to the connecting electrode 23.

As mentioned above, in this embodiment, the lid 29 supports a plurality of the short-circuit conductors 23.

Figure 9:
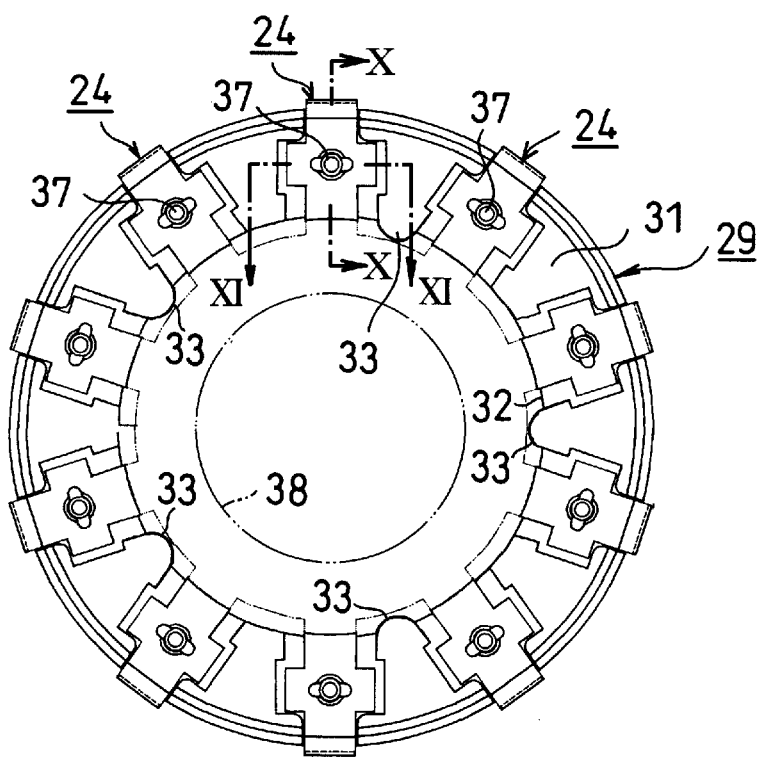
FIG. 9 is a rear view in which each of short-circuit conductors is mounted to a lid for closing an annular groove.
Figure 10:
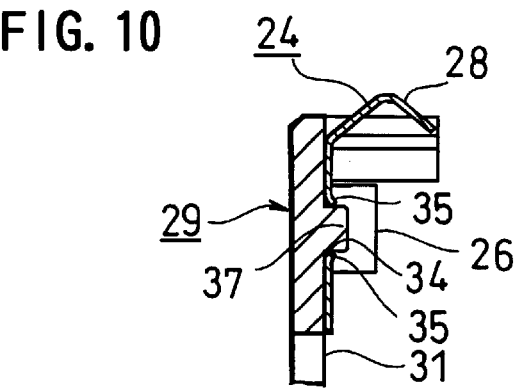
FIG. 10 is a sectional view taken along the line X—X in FIG. 9.
Figure 11:
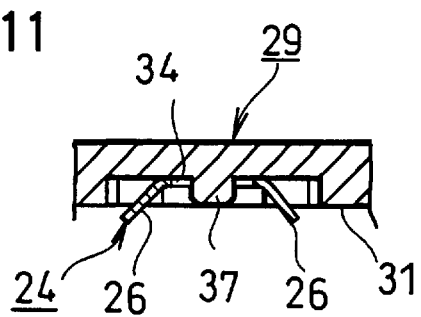
FIG. 11 is a sectional view taken along the line XI—XI in FIG. 9.
Figure 12:
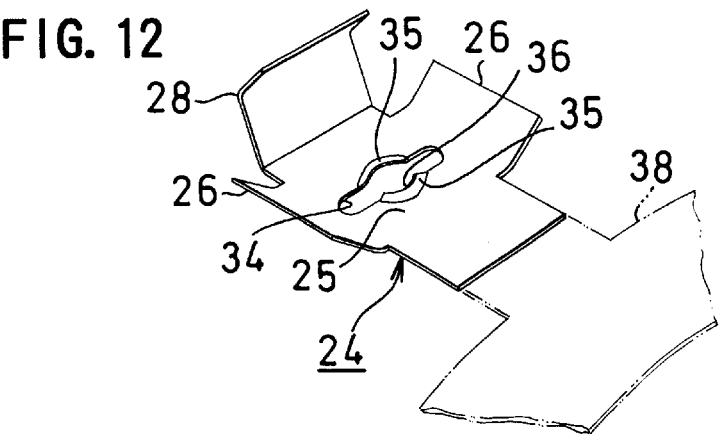
FIG. 12 is a perspective view of a back of the short-circuit conductor.

FIGS. 9, 10 and 11 illustrate that the short-circuit conductor 24 as shown in FIG. 12 is mounted to the lid 29.

FIG. 12 is a perspective view in which the short-circuit conductor 24 is seen from its back in which a bore 34 is formed in its middle. The bore 34 has an engagement bore 36 which has non-return portions 35.

The inner surface 31 of the lid 29 has an engagement projection 37 which fits the engagement bore 36 of the short-circuit conductor 24 when the lid 29 is engaged in the groove 17. The short-circuit conductor 24 is previously mounted to the engagement projection 37 via the engagement bore 36.

Further, by a connecting member 38 as shown by dotted lines in FIG. 9, the lids 29 are connected at the inner portion in a radial direction, thereby facilitating positioning between the engagement bore and projection to increase working efficiency.

The connecting member 38 is cut off after the lid 29 is connected to the short-circuit conductor 24. A cutting portion of the connecting member 38 is engaged at the circumferential surface 17a of the annular groove 17.

Figure 13:
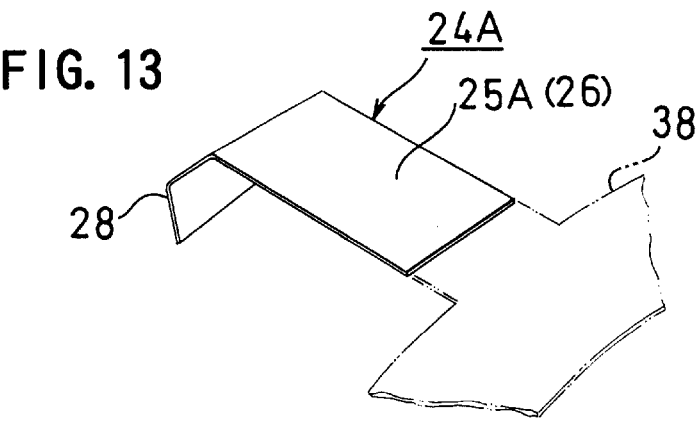
FIG. 13 is a perspective view of a front of another embodiment of a short-circuit conductor.
Figure 14:
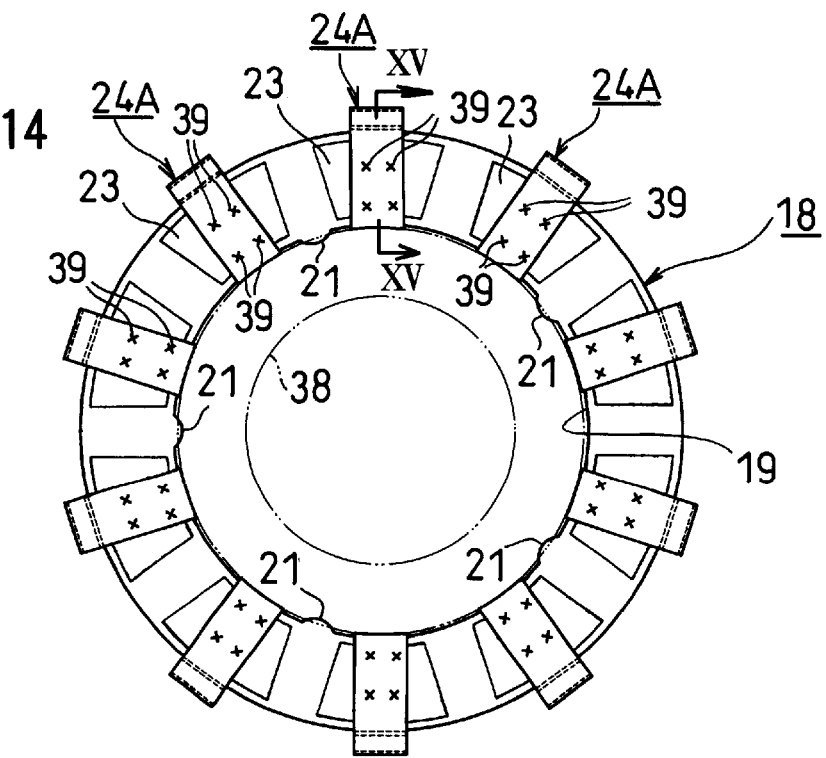
FIG. 14 is a front view of a connecting electrode of an annular noise-preventing electric element to which the short-circuit conductors in FIG. 13 are mounted.
Figure 15:
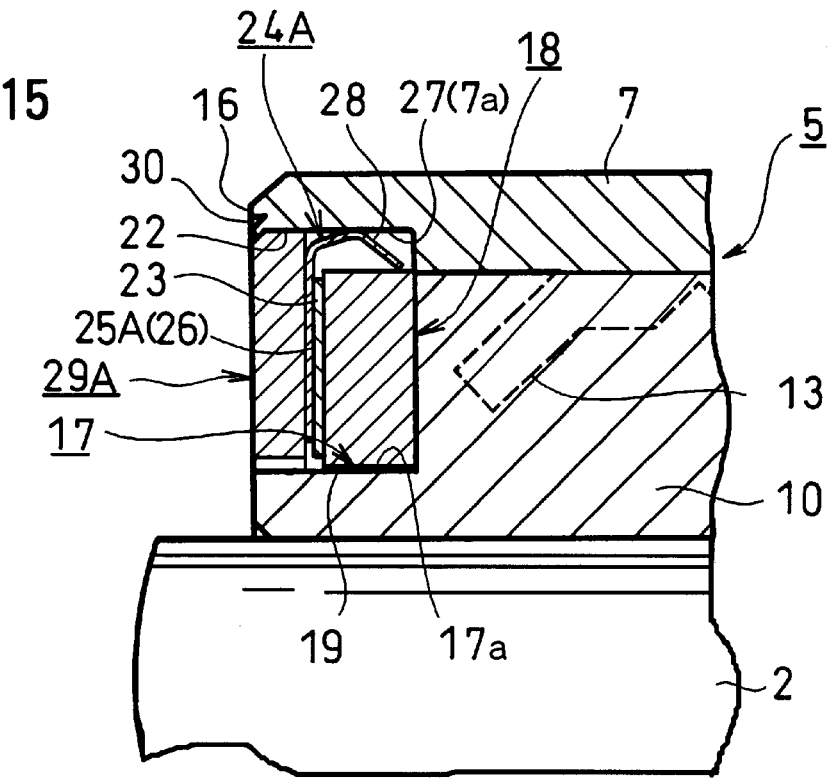
FIG. 15 is an enlarged sectional view in which the short-circuit conductor and noise-preventing electric element in FIG. 13 are mounted to an annular groove, similar to FIG. 5.

FIGS. 13, 14 and 15 illustrate variations of the short-circuit conductor 24. In a short-circuit conductor 24A of this embodiment, a base 25A is employed as a contact 26 with the noise-preventing electric element 18, and located in the middle of the connecting electrode 23 of the noise-preventing electric element 18 as shown in FIG. 14. The base 25A is welded at a plurality of spots 39 by irradiating laser beam, and the noise-preventing electric element itself is adapted to act as annular support member. The contact 28 with the commutator segment is the same as that in above in shape.

A connecting member 38 as shown by a dotted line in FIG. 14 is cut off when the short-circuit conductor 24A is mounted to the noise-preventing electric element 18 similar to the above. The connecting member 38 is gently engaged with the circumferential surface 17a of the groove 17.

FIG. 15 is a sectional view similar to FIG. 5. A lid 29A used in this embodiment has such thickness as to avoid gaps in the groove 17 when the noise-preventing electric element 18 to which the short-circuit conductor 24A is mounted is engaged in the groove 17, and has a flat surface which can be easily manufactured at low cost compared with the lid 29 in the foregoing embodiment.

Figure 16:
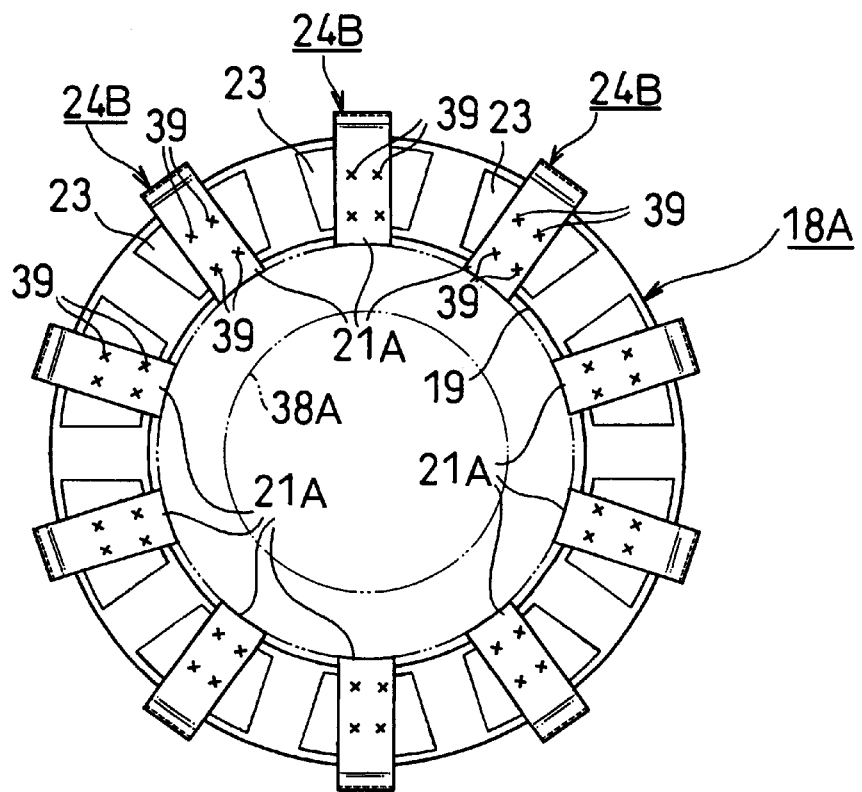
FIG. 16 is a front view which shows anther embodiment of a short circuit conductor, the noise-preventing electric element acting as an annular support.
Figure 17:
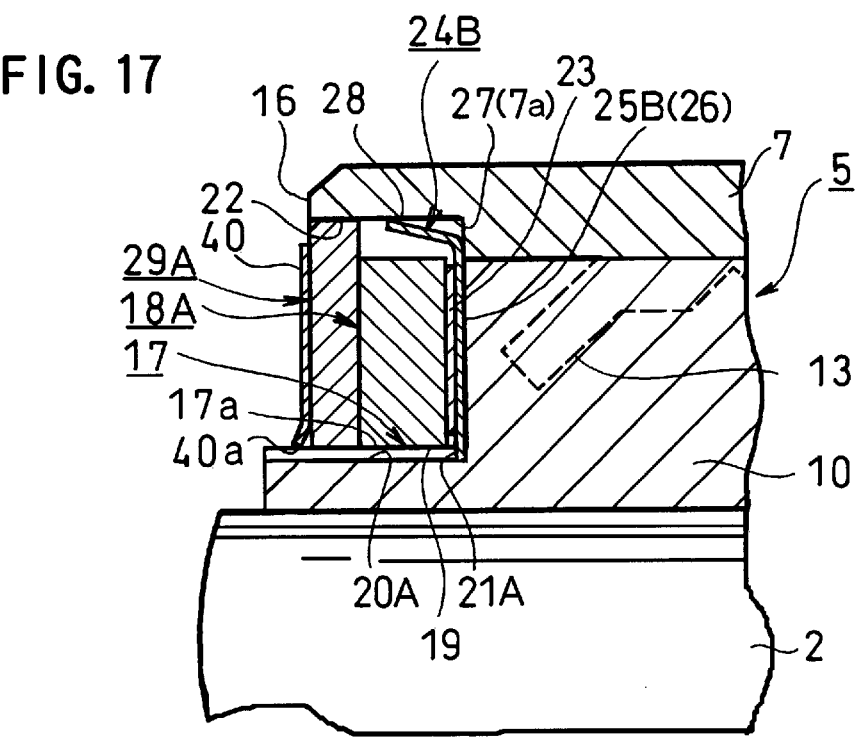
FIG. 17 is a vertical sectioned side view similar to FIG. 5.
Figure 18:
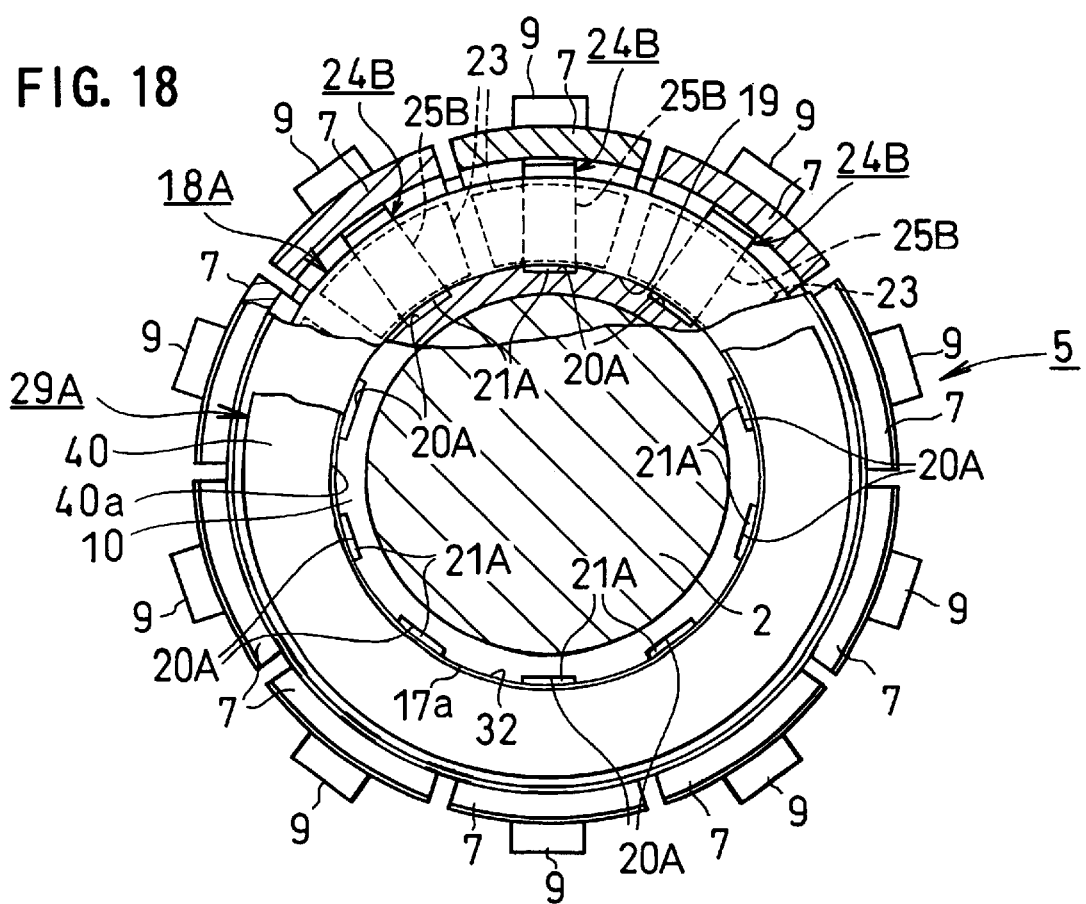
FIG. 18 is a vertical sectioned front view of FIG. 17.

FIGS. 16, 17 and 18 illustrate another variation of the short-circuit conductor 24,24A, in which there is no positioning projection 21 on the inner circumferential surface 19 of the noise-preventing electric element 18A.

As shown in FIG. 16, the short-circuit conductor 24B connected to a connecting member 38 is welded to the noise-preventing electric member 18A at a plurality of spots 39 as mentioned above. The connecting member 38A is cut so that the short-circuit conductor 24B may be longer than the circumferential surface 17a of the groove 17.

The inner circumferential surface 19 of the noise-preventing electric element 18A is engaged on the circumferential surface 17a of the groove 17, and cut-out portion of the base 25B is slightly projected from the inner circumferential surface 19 to form an engagement portion 21A for positioning.

As shown in FIGS. 17 and 18, the engagement portion 21A of the short-circuit conductor 24B is engaged in an elongate groove 20A of the circumferential surface 17a of the groove 17, and the noise-preventing electric element is inserted in the groove 17 so that the short-circuit conductor 24B is engaged with the outer circumferential surface 7a of the commutator segment 7.

In this embodiment, the end of the contact 28 is elastically engaged with the inner circumferential surface of the commutator segment 7, thereby preventing disconnecting of the conductor.

Without further support means, it is usable, but in order to keep safety, the lid 29A is engaged in the groove 17, and an annular thin push nut 40 is attached on the end of the commutator 5 to support the lid 29A. The circumferential surface 17a of the groove 17 extends slightly from the end 16 of the commutator 5 in an axial direction.

The push nut 40 has a bent portion 40a which is engaged on the circumferential surface 17a to prevent detachment. This embodiment has no complicate parts, and can be easily manufactured.

Figure 19:
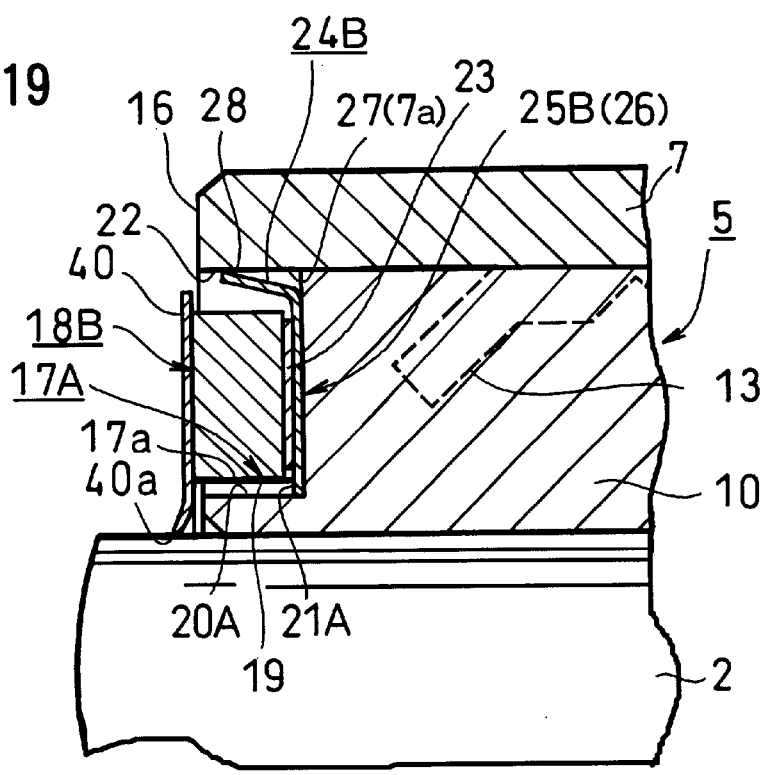
FIG. 19 is a vertical sectioned side view which shows an embodiment in which no lid is provided in an annular groove, similar to FIG. 5.

FIG. 19 illustrates a variation without lid. The other parts are the same as that in FIG. 17. An axial length of the groove 17A is slightly smaller than axial length of the noise-preventing electric element 18B. When the noise-preventing electric element 18B is inserted in the groove 17A, it slightly projects from the axial end of the groove 17A. The axial end of the noise-preventing electric element 18B is held by a push nut 40. The radial end 40a of the push nut 40 is engaged on the shaft 2.

When the noise-preventing electric element 18B is a varistor, an annular insulating film is put between the varistor 18B and the push nut 40, or insulating coating is applied on the axial end face of the varistor 18B to prevent electric conduction between the varigtor 18B and the shaft 2.

Figure 20:
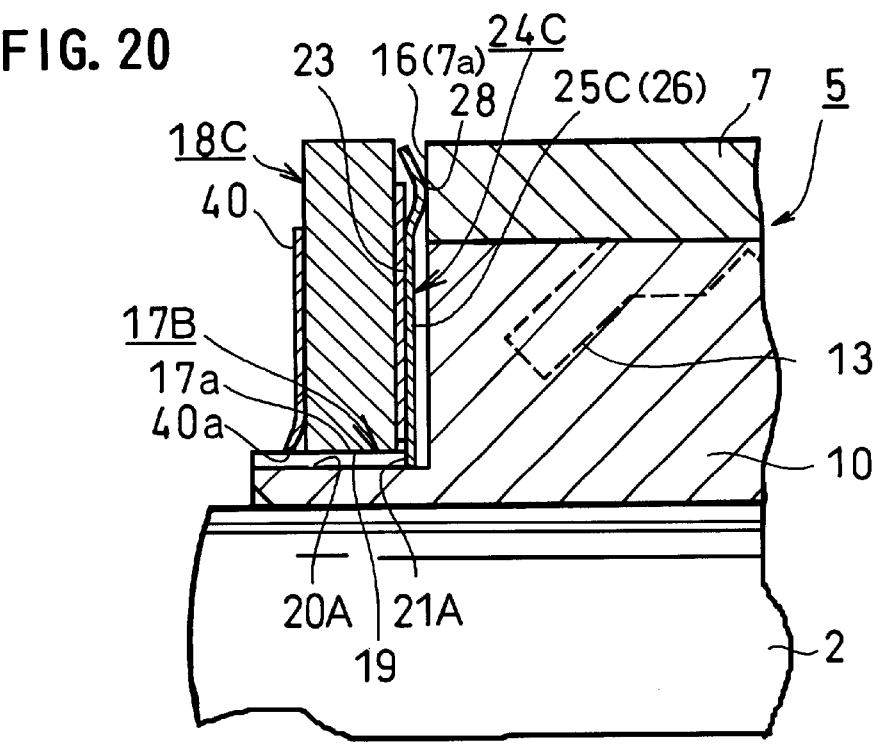
FIG. 20 is a vertical sectioned side view which illustrates an embodiment in which a short-circuit conductor is engaged on the end face of a commutator segment.

FIG. 20 illustrates an embodiment in which a short-circuit conductor 24C is engaged with the axial end of the commutator segment 7. The noise-preventing electric element 18C is the same as that in FIG. 16. The short-circuit conductor 24C has a base 25C and a bent portion at the outer radial end. The bent portion forms a contact 28 with the commutator segment 7. The base 25C has an engagement portion 21A at the inner radial end, and a connecting electrode 23 of the noise-preventing electric element. The short-circuit conductor 24C is mounted in a similar way to FIG. 17.

The axial end 16 of the commutator segment 7 is cut away to form the annular notch 17B, and is formed as a contact portion 7a.

The noise-preventing electric element 18C on which the short-circuit conductor 24C is attached to the connecting electrode 23 is engaged on an annular notch 17B, and the contact 28 of the short-circuit conductor 24C is engaged on the end face 7a of the commutator segment 7. The noise-preventing electric element 18C is held by a push nut 40 in which the inner rdial end 40a is engaged on the annular notch 17B.

In this embodiment, there is no groove in the annular notch 17B, thereby facilitating manufacturing and increasing size allowability.

Figure 21:
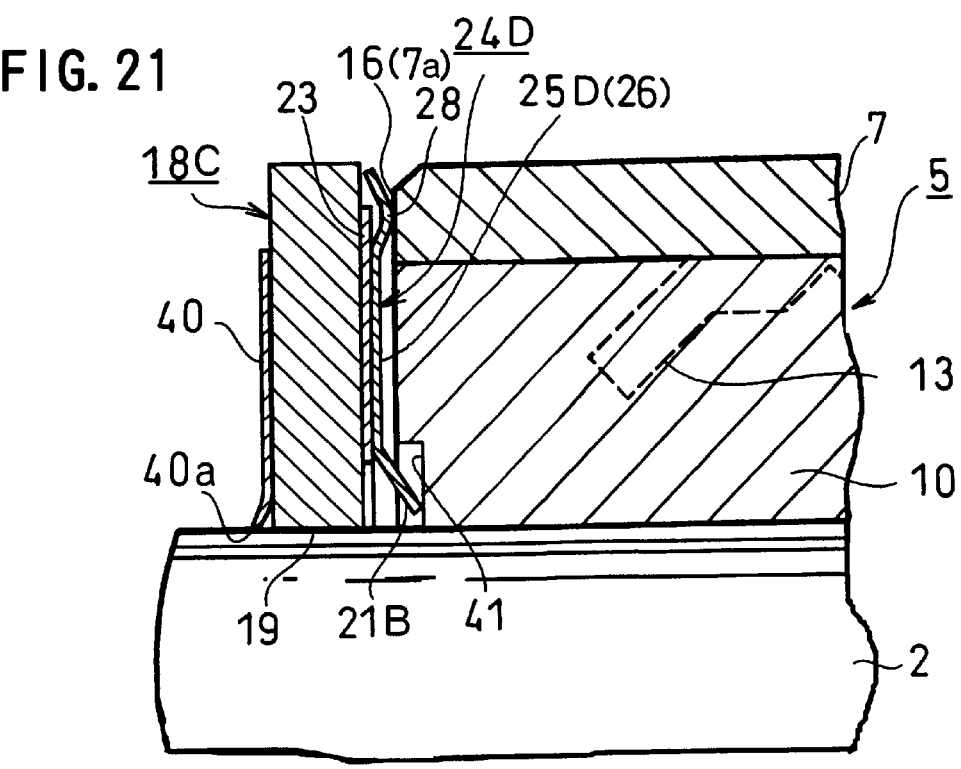
FIG. 21 is a vertical sectioned side view, similar to FIG. 5, which illustrates an embodiment in which a short-circuit conductor is engaged on the end face of a commutator segment without an annular step.

FIG. 21 illustrates an embodiment in which there is no annular notch. A noise-preventing electric element 18C on which a short-circuit conductor 24D is mounted to a connecting electrode 22 is similar to that in FIG. 20. An engagement portion 21B of a short-circuit conductor 24D is engaged in a bore 41. A noise-preventing electric element 18C and a push nut 40 abut on a shaft 2. Others are the same as those in FIG. 20.

When the noise-preventing electric element 18C comprises a varistor, the noise-preventing electric element is electrically insulated from the push nut 40, and insulating coating is applied to the inner circumferential surface of the noise-preventing electric element 18c to prevent electric conduction to the shaft 2.

This embodiment is carried out without great change to the prior art and usable without modification of the commutator 5.

Figure 22:
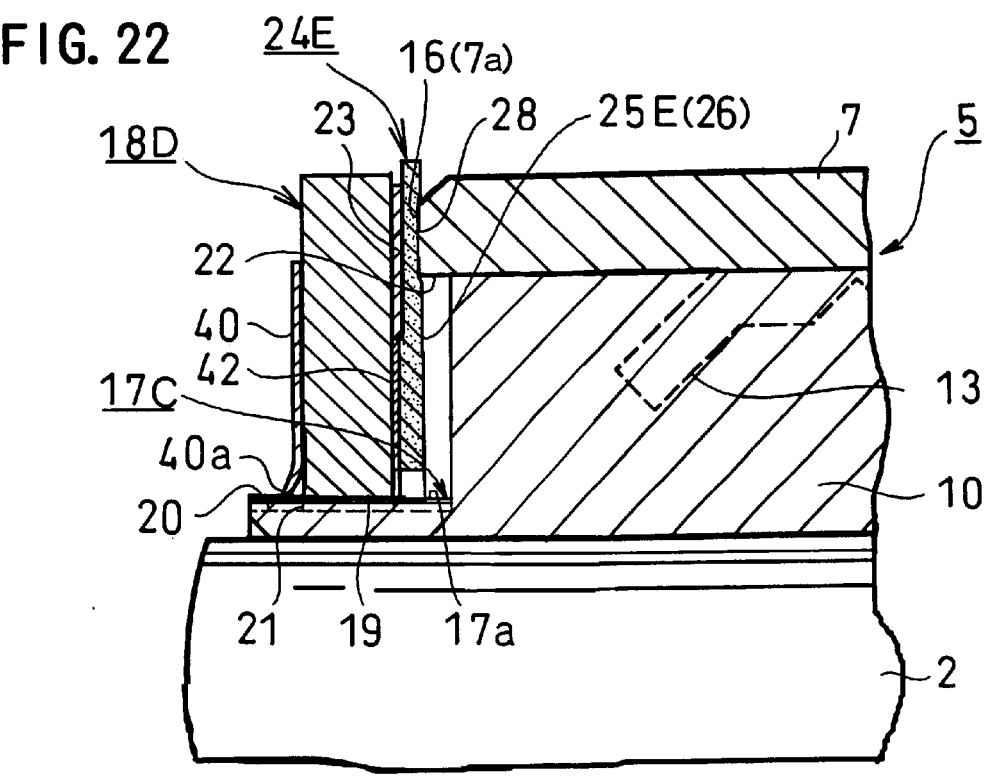
FIG. 22 is a vertical sectioned side view, similar to FIG. 5, which illustrates another embodiment in which a short-circuit conductor is engaged on the end face of a commutator segment.

FIG. 22 illustrates a variation in which a short-circuit conductor 24E is made of an electrically conductive rubber.

A noise-preventing electric element 18D is the same as that in FIG. 14, and has a projection 21 on the inner circumferential surface. The projection 21 is engaged in a groove 20 on the outer circumferential surface of the annular notch 17C. The end of a commutator segment 7 is slightly projected and comprises a contact surface 7a. A base 25E of the short-circuit conductor 24E is bonded by adhesive to the noise-preventing electric element 18D, which forms an annular support for the short-circuit conductor 24E.

The noise-preventing electric element 18D is put on the outer circumferential surface of an annular notch 17C, and pressed by a push nut 40. The short-circuit conductor 24E is put between a connecting electrode 23 and a contact surface 7a of the commutator segment 7 to decrease electric resistance and assure electric connection. The short-circuit conductor 24E is made of conductive rubber. Therefore, even if pressing force is applied to the noise-preventing electric element 18D, there would be no possibility of breakage of the electric element such as a ceramic varistor.

Figure 23:
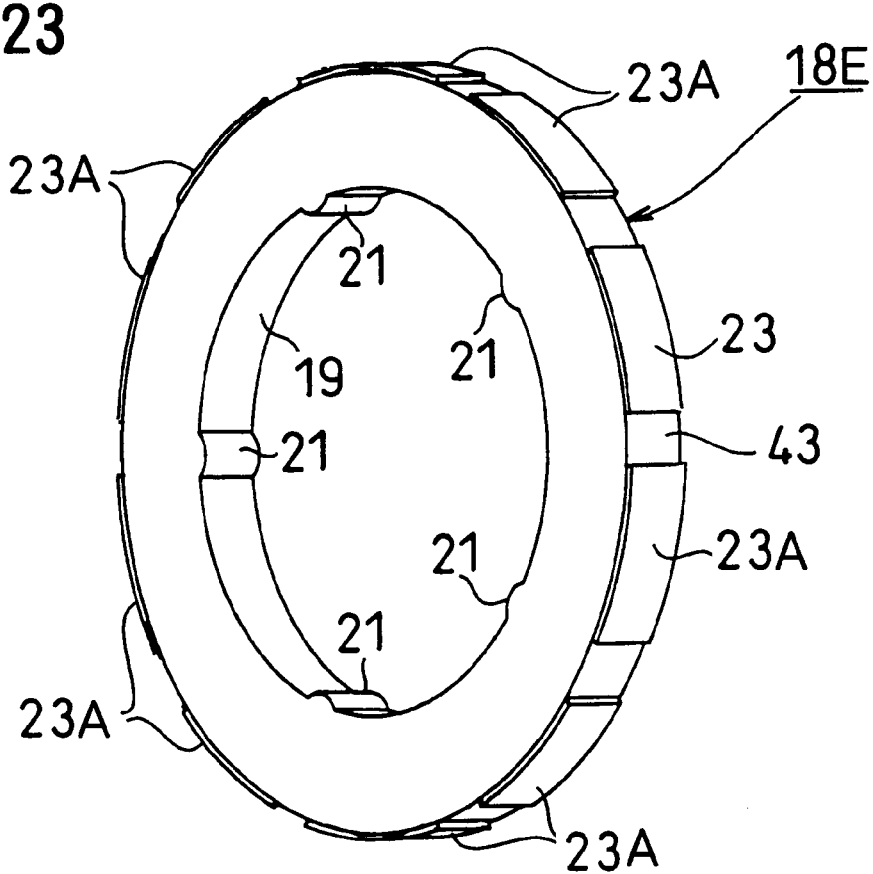
FIG. 23 is a perspective view of another embodiment of an annular noise-preventing electric element.
Figure 24:
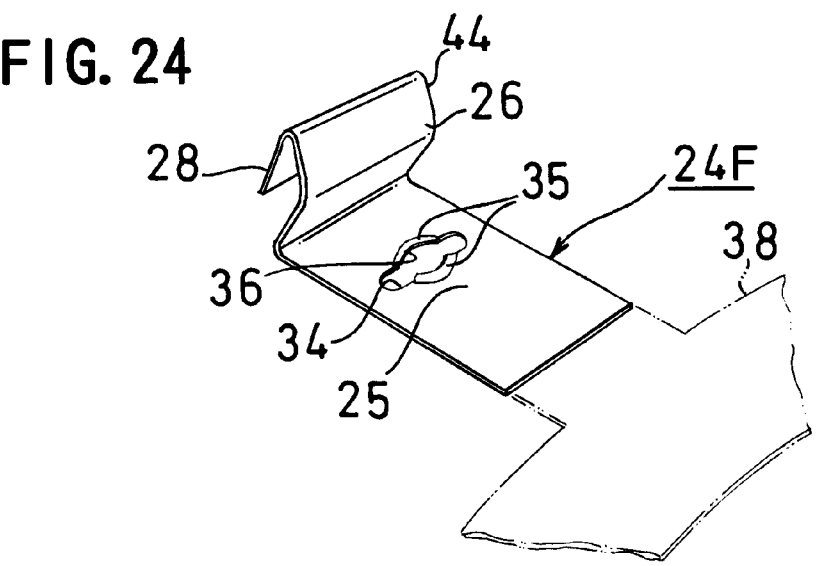
FIG. 24 is a perspective view of a short-circuit conductor which is fitted with the annular noise-preventing electric element in FIG. 23.
Figure 25:
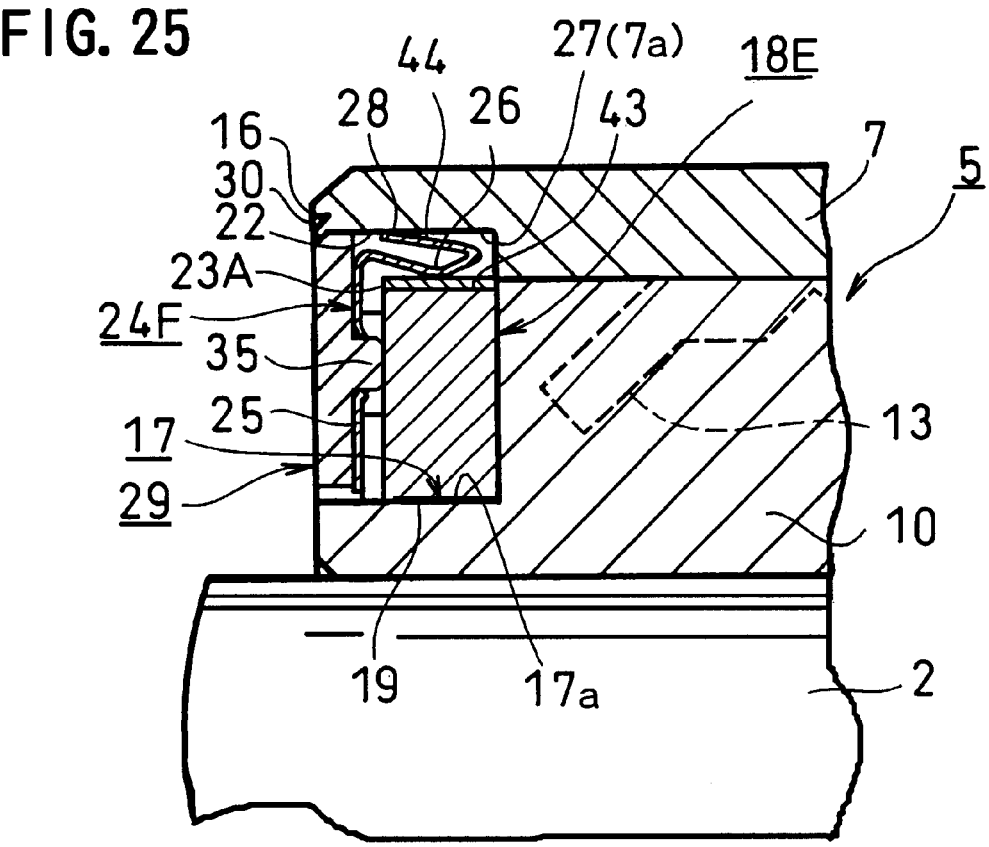
FIG. 25 is an enlarged sectional view, similar to FIG. 5, including the annular noise-preventing electric element in FIG. 23 and the short-circuit conductor in FIG. 24.

FIGS. 23, 24 and 25 illustrate that a connecting electrode 23 is located at a position different from the annular noise-preventing electric elements 18,18A, 18B,18C,18D. A noise-preventing electric elements 18E are similar to that in FIG. 16, and each of connecting electrodes 23A is located on the outer circumferential surface 43 at regular intervals to correspond to a commutator segment 7.

FIG. 24 illustrates a short-circuit conductor 24F suitable for the noise-preventing electric element 18E. The short-circuit conductor 24F comprises a base 25 which has an engagement bore 34, and an elastic contact 44 which is bent. The end 28 of the contact 44 is engaged on the commutator segment 7, and a corner 26 of the contact 44 is engaged on the connecting electrode 23A.

In this embodiment, the commutator segment 7 is opposite to the connecting electrode 23A, the contact 44 being put therebetween, thereby assuring sure electrical connection.

The foregoing relate to embodiments of the invention. Various changes and modifications can be made by person skilled in the art without departing from the scope of claims wherein:

What is claimed is:

1. A commutator for an electric motor, the commutator having a first axial end which is connected to an armature and a second axial end opposite the first end, comprising:

a shaft;

an insulating tube around the shaft;

a plurality of commutator segments which axially extend on an outer circumferential surface of the insulating tube;

an annular noise-preventing electric element at the second axial end of the commutator, having a plurality of connecting electrodes on an axial end face;

a plurality of short-circuit conductors, each of the conductors electrically connecting each of the commutator segments to each of the connecting electrodes of the annular noise-preventing electric element; and wherein the short-circuit conductor has a bent portion at one end which is engaged on an inner circumferential surface of the commutator segment.

2. A commutator as claimed in claim 1 wherein the annular noise-preventing electric element comprises a varistor.

3. A commutator as claimed in claim 1 wherein the annular noise-preventing electric element is supported by a push nut.

4. A commutator as claimed in claim 1 wherein the short-circuit conductor is made of conductive rubber.

5. A commutator for an electric motor, the commutator having a first axial end which is connected to an armature and a second axial end opposite the first end, comprising:

a shaft;

an insulating tube around the shaft;

a plurality of commutator segments which axially extend on an outer circumferential surface of the insulating tube;

an annular noise-preventing electric element at the second axial end of the commutator, having a plurality of connecting electrodes on an axial end face; and a plurality of short-circuit conductors, each of the conductors electrically connecting each of the commutator segments to each of the connecting electrodes of the annular noise-preventing electric element wherein the commutator segment and the insulating tube are cut away at the second axial end to form an annular groove in which the noise-preventing electric element and the short-circuit conductor are inserted.

6. A commutator as claimed in claim 5 wherein the short-circuit conductor is supported by an annular lid which is engaged in the annular groove.

7. A commutator as claimed in claim 5 wherein a short-circuit conductor has an engagement bore in which an engagement projection of the lid is fitted, thereby facilitating positioning of the conductor in the annular groove.

8. A commutator as claimed in claim 6 wherein the lid is supported by a push nut.

9. A commutator as claimed in claim 5 wherein the connecting electrode is mounted on a surface of the noise-preventing electric element, and contacts the short-circuit conductor.

10. A commutator for an electric motor, the commutator having a first axial end which is connected to an armature and a second axial end opposite the first end, comprising:

a shaft;

an insulating tube around the shaft;

a plurality of commutator segments which axially extend on an outer circumferential surface of the insulating tube;

an annular noise-preventing electric element at the second axial end of the commutator, having a plurality of connecting electrodes on an axial end face; and a plurality of short-circuit conductors, each of the conductors electrically connecting each of the commutator segments to each of the connecting electrodes of the annular noise-preventing electric element wherein one end of the short-circuit conductor is engaged on an inner circumferential surface of the commutator segment, the other end being connected to the connecting electrode.

11. A commutator for an electric motor, the commutator having a first axial end which is connected to an armature and a second axial end opposite the first end, comprising:

a shaft;

an insulating tube around the shaft;

a plurality of commutator segments which axially extend on an outer circumferential surface of the insulating tube;

an annular noise-preventing electric element at the second axial end of the commutator, having a plurality of connecting electrodes on an axial end face; and a plurality of short-circuit conductors, each of the conductors electrically connecting each of the commutator segments to each of the connecting electrodes of the annular noise-preventing electric element wherein the annular noise-preventing electric element is supported by a push nut wherein the short-circuit conductor is engaged on a face of the second axial end, the short-circuit conductor being engaged on the connecting electrode of the noise-preventing electric element.

12. A commutator as claimed in claim 11 wherein the short circuit conductor, the noise-preventing electric element and the push nut are provided at a stepped portion at the second axial end of the commutator.

* * * * *